(12) United States Patent
Li (10) Patent No.: US 7,434,464 B2
(45) Date of Patent: Oct. 14, 2008

(54) METHODS AND APPARATUS FOR A MEMS GYRO SENSOR

(75) Inventor: Gary G. Li, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 56 days.

(21) Appl. No.: 11/529,983

(22) Filed: Sep. 29, 2006

(65) Prior Publication Data

US 2008/0078246 A1 Apr. 3, 2008

(51) Int. Cl.
*G01P 9/04* (2006.01)
*G01C 19/00* (2006.01)

(52) U.S. Cl. .................. 73/504.04; 73/504.12

(58) Field of Classification Search ............ 73/504.02, 73/504.04, 504.12, 504.14, 504.15, 504.16
See application file for complete search history.

(56) References Cited

U.S. PATENT DOCUMENTS

| | | | | |
|---|---|---|---|---|
| 6,892,575 | B2 * | 5/2005 | Nasiri et al. | 73/504.12 |
| 6,928,872 | B2 * | 8/2005 | Durante et al. | 73/504.04 |
| 6,964,195 | B2 * | 11/2005 | Hobbs et al. | 73/504.14 |
| 6,966,224 | B2 * | 11/2005 | Yan et al. | 73/504.14 |
| 7,258,008 | B2 * | 8/2007 | Durante et al. | 73/504.04 |
| 7,258,010 | B2 * | 8/2007 | Horning et al. | 73/514.32 |
| 7,275,433 | B2 * | 10/2007 | Caminada et al. | 73/514.18 |

OTHER PUBLICATIONS

Acar, Cenik, et al, Inherently Robust Micromachined Gyroscopes with 2-DOF Sense-Mode Oscillator, Journal of Microelectromechanical Systems, vol. 15., No. 2, pp. 380-387. Apr. 2006.
Gomez, U.M., et al, New Surface Micromachined Angular Rate Sensor For Vehicle Stabilizing Systems In Automotive Applications, Robert Bosch GmbH, Germany.
Gomez, U.M., et al, New Surface Micromachined Angular Rate Sensor For Vehicle Stabilizing Systems In Automotive Applications, Robert Bosch GmbH, Germany, no date available.

* cited by examiner

*Primary Examiner*—Helen C. Kwok
(74) *Attorney, Agent, or Firm*—Ingrassia, Fisher & Lorenz, P.C.

(57) ABSTRACT

A gyro sensor configured to sense an angular rate about a rotational axis includes a drive mass configured to undergo oscillatory linear motion within a plane, and a sense mass configured to undergo an oscillatory motion out of the plane as a function of the angular rate. A link spring component connects the sense mass to the drive mass such that the sense mass is substantially decoupled from the drive mass with respect to the oscillatory linear motion of the drive mass, but is coupled to the drive mass with respect to the oscillatory motion out of the plane of the sense mass.

20 Claims, 6 Drawing Sheets

METHODS AND APPARATUS FOR A MEMS GYRO SENSOR

TECHNICAL FIELD

The present invention relates generally to micro-electromechanical systems (MEMS) and, more particularly, to an improved MEMS angular rate sensor.

BACKGROUND

Micro-electromechanical systems (MEMS) technology has achieved wide popularity in recent years, as it provides a way to make very small mechanical structures using conventional batch semiconductor processing techniques. One such device is the MEMS gyro sensor, which is used in a variety of applications.

Alternatively referred to as a "gyrometer," "yaw rate sensor," or "angular rate sensor," a gyro sensor senses angular speed around one or more axes. Thus, unlike accelerometers and other inertial sensors, a gyro sensor detects the rate of charge of a position variable—i.e., angular position. One such sensor, referred to as an "x-axis" gyro, is configured to sense angular rotation about an axis parallel to the gyro substrate due to the influence of a Coriolis acceleration component.

Currently known x-gyro sensors are unsatisfactory in a number of respects. For example, most x-gyro sensors exhibit large quadrature errors because of unwanted communication of the drive signal to the sense signal. That is, most prior art sensors include a single mass that functions as both the sense mass and drive mass, or separate masses that are nonetheless mechanically coupled such that the oscillatory movement of the drive mass effectively "contaminates" the response movement of the sense mass.

Accordingly, it is desirable to provide improved MEMS x-gyro sensors with reduced coupling between the drive mass and the sense mass that would result in a much lower unwanted coupling noise. Other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the various embodiments may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the scope or application of possible embodiments. Furthermore, there is no intention to be bound by any expressed or implied theory presented in the preceding technical field, background, brief summary or the following detailed description.

Various embodiments may be described herein in terms of functional and/or logical block components and various processing steps. It should be appreciated that such block components may be realized by any number of hardware, software, and/or firmware components configured to perform the specified functions. For the sake of brevity, conventional techniques related to semiconductor processing, MEMS processing, and sensor technology are not described herein.

In general, a MEMS gyro sensor in accordance with one embodiment includes a drive mass configured to undergo oscillatory linear motion within a plane, a sense mass configured to undergo an oscillatory motion out of the plane as a function of the angular rate, and one or more link spring components configured to connect the sense mass to the drive mass such that the sense mass is substantially decoupled from the drive mass with respect to the oscillatory linear motion of the drive mass, but is coupled to the drive mass with respect to the oscillatory motion out of the plane of the sense mass. By decoupling the two masses in this way, the quadrature error, as well as the electrical noise from the drive mass to the sense mass of the gyro sensor can be substantially reduced.

Figure 1:
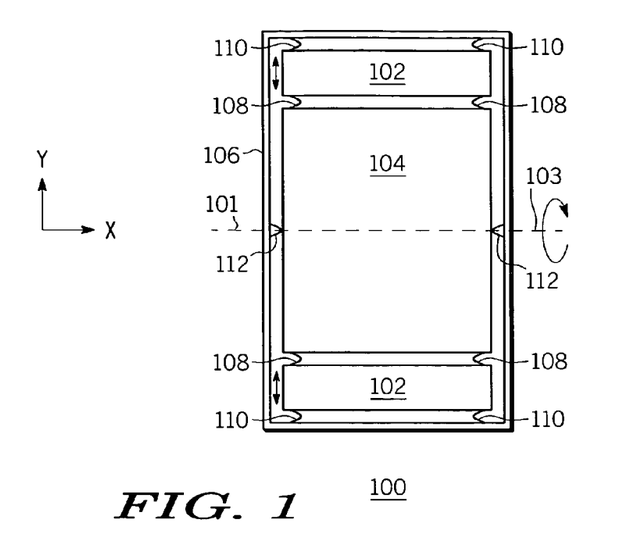
FIG. 1 is a conceptual overview of an x-gyro in accordance with one embodiment.

FIG. 1 depicts a conceptual overview of an example angular rate sensor (also referred to, in a non-limiting manner, as a "gyroscope," "x-gyro" or simply "gyro"). As a preliminary matter, it should be noted that the figures are not intended as scale drawings, and that the relative dimensions of layers and spacing as shown are merely to assist with illustrating the various embodiments.

X-gyro 100 is generally configured to sense an angular rate about rotational axis 103. In this regard, by convention, X-gyro 100 is illustrated as having a generally planar structure within the x-y plane, wherein the z-axis extends out of the page, normal to the x-y plane. X-gyro 100 includes one or more drive masses 102, one or more sense masses 104, a coupling structure 106, and various mechanical linkages provided therebetween, depending upon the particular embodiment. Note that while various embodiments might include two or more drive masses and/or two or more sense masses, these masses are often referred to herein collectively, in the singular. Thus, the two individual drive mass components 102 situated generally symmetrically about the rotational axis 103 are referred to simply as "drive mass 102."

Drive mass 102 is configured to undergo oscillatory linear motion within a plane—i.e., the x-y plane, as illustrated. The direction of this motion may vary, depending upon the embodiment. In the illustrated embodiment, wherein the rotational axis is designated as an x-axis—drive mass 102 undergoes oscillatory linear motion substantially parallel to a y-axis (i.e., up and down in FIG. 1). As a result of Coriolis forces, sense mass 104 is configured to undergo an oscillatory motion out of the plane (i.e., the x-y plane) along the z-axis as a function of the angular rate of x-gyro 100 about rotational axis 103.

A link spring component 108 couples sense mass 104 to drive mass 102 such that sense mass 104 is substantially decoupled from drive mass 102 with respect to the oscillatory linear motion of the drive mass, but is coupled to drive mass 102 with respect to the oscillatory motion out of the plane of sense mass 104. Stated another way, the linkage between drive mass 102 and sense mass 104 is configured such that sense mass 104 is relatively unaffected by the up-and-down motion of drive mass 102, but is linked to drive mass 102 as the two structures undergo out-of-plane motion during rotation of x-gyro 100.

A coupling structure 106 may be included, and may have any convenient shape. In the conceptual diagram shown in FIG. 1, coupling structure 106 surrounds both drive mass 102 and sense mass 104. The range of possible embodiments is not so limited, however, as will be shown below. In general, sense mass 104 is connected to coupling structure 106 via a torsional spring 103. Similarly, coupling structure 106 is connected to drive mass 102 via a drive spring 110. This spring may have, for example, a slender folded beam structure. Coupling structure 106 can help restrict operation to a single drive frequency and synchronize both the in-plane drive motion and/or the out of plane sense response.

The shape, size, material, and spring constants of the various springs 110, 108, and 112 may be selected in accordance with known mechanical design principles to achieve the desired sensitivity, stability, and range of x-gyro 100. Indeed, the static and dynamic properties of the structure as a whole may be readily specified given the various constituent layers using standard mechanical methods known in the art (e.g., empirical methods, finite-element modeling, closed-form calculations, or the like). In the illustrated embodiment, X-gyro is fabricated using conventional MEMS techniques and materials—e.g., silicon dioxide, single crystal silicon, polysilicon, etc. In one embodiment, x-gyro 100 is generally rectangular, with a y-axis dimension of about 2000 microns, and a x-axis dimension of about 1800 microns. In various embodiments, the structural thickness of the moving elements ranges from about 4.0 µm to 100 µm.

Figure 2:
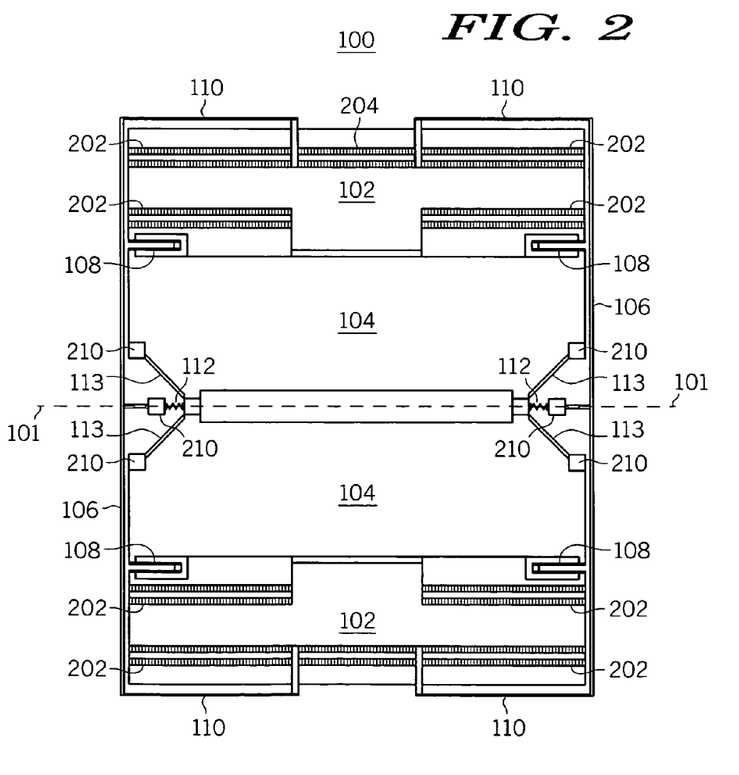
FIG. 2 is a top view of an x-gyro in accordance with an exemplary embodiment.

FIG. 2 depicts a specific embodiment, further including a drive electrode structure 202 coupled to drive mass 102, wherein drive electrode structure 202 is configured to produce, in response to an electrical signal (not shown), the oscillatory linear motion of drive mass 102 within the x-y plane. Various anchor structures 210 may also be included, as is known in the MEMS art. Additional spring elements 113 extending at approximately 45 degrees from anchors 210 to mass 104, thus providing additional torsional movement yet resisting the in plane motion of the sense mass This embodiment further includes a sense electrode structure (or "feedback structure") 204 configured to sense (directly or indirectly) the linear motion of drive mass 102. The nature of these electrode structures will be described in further detail below. It will be understood that various electrical interconnects (e.g., signal lines) will extend from nodes outside of device 100 (e.g., various microprocessors, signal processors, and the like) to electrodes 204 and 202. For the purposes of simplicity, such conventional electrical interconnects and components are not illustrated in the figures.

Figure 3:
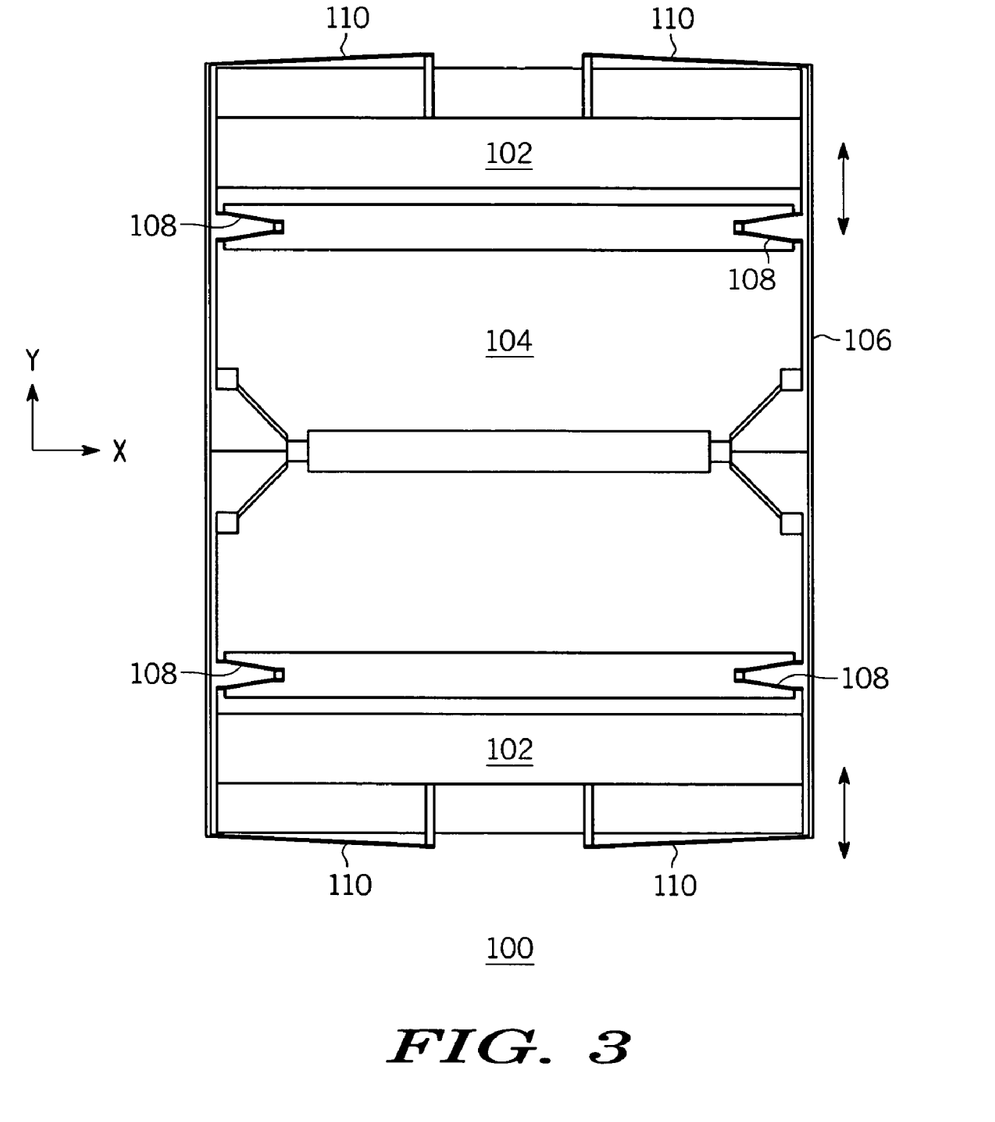
FIG. 3 is a top view of the x-gyro of FIG. 2, depicting deformation of drive mass during operation.

FIG. 3 shows a simplified view of an x-gyro in accordance with the embodiment illustrated in FIG. 2, depicting the oscillatory motion of drive mass 102. As shown, drive mass 102 has moved upward (in the positive y direction) such that link springs 108 experience tension conditions, and drive springs 110 experience bending. Drive mass 102 will thus oscillate up and down with respect to its equilibrium, unstressed state. It will be seen that the individual drive mass components 102 move generally symmetrically outward and inward with respect to rotational axis 103.

Figure 4:
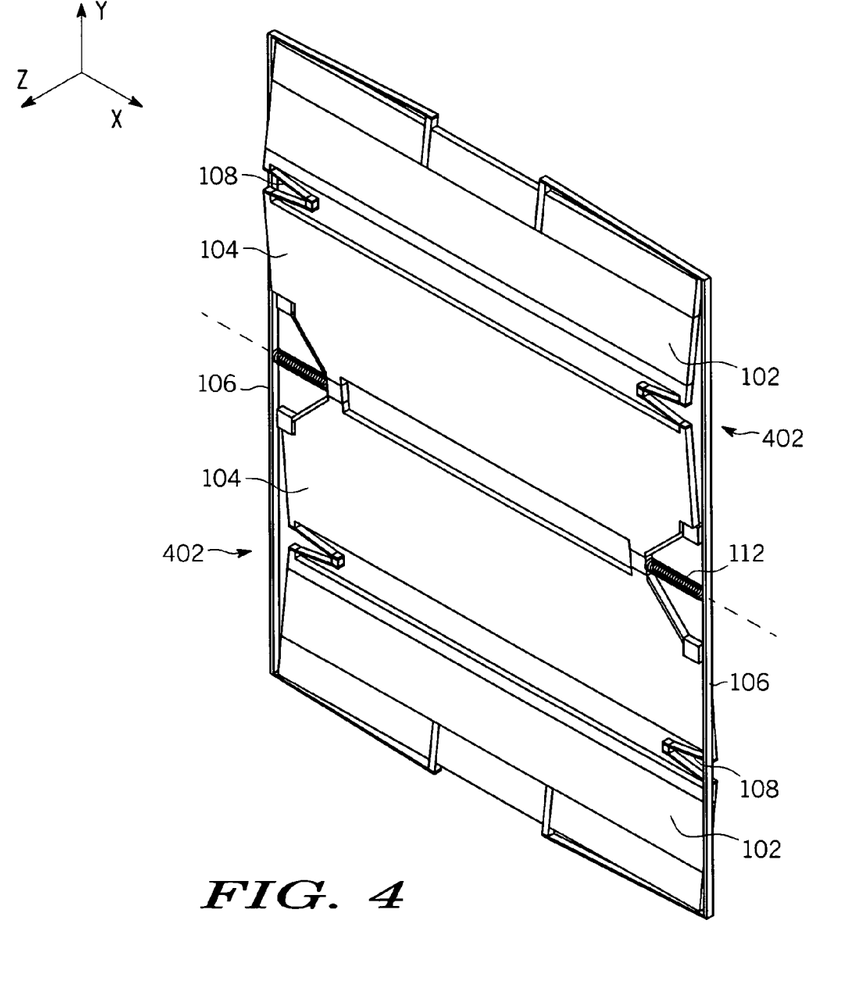
FIG. 4 is an isometric view of the x-gyro of FIG. 2, illustrating out-of-plane motion.

FIG. 4 shows a simplified isometric view of an x-gyro in accordance with the embodiment shown in FIG. 2 during operation (i.e., during rotation about the rotational axis). Due to Coriolis forces, described previously, sense mass 104 oscillates rotationally back and forth out of the plane, causing displacement as illustrated in region 402. In this embodiment, coupling structure 106 generally defines the x-y plane, and both drive mass 102 and sense mass 402 move out of this plane due to the linkage provided by link springs 108. Torsional spring 112 facilitates the oscillatory motion of sense mass 104, and is directly anchored to the substrate (not shown).

As mentioned previously, link springs 108 may have any convenient shape, and may be positioned between sense mass 104 and drive mass 102 in whichever manner provides the desired x-gyro response. Referring again to FIG. 2, for example, one embodiment of a MEMS link spring 108 has an elongated "u-shape" wherein the length (along x-axis) is substantially greater than its width (along y-axis). This structure is advantageous as it has a low effective spring constant along the y-axis (and thus facilitates decoupling of mass 102 from 104), but at the same time has a sufficient torsional spring constant such that the out-of-plane movement of sense mass 104 is accompanied by out-of-plane movement of drive mass 102. In one embodiment, the link spring is pitch-fork-shaped, as shown in FIG. 5.

Figure 5:
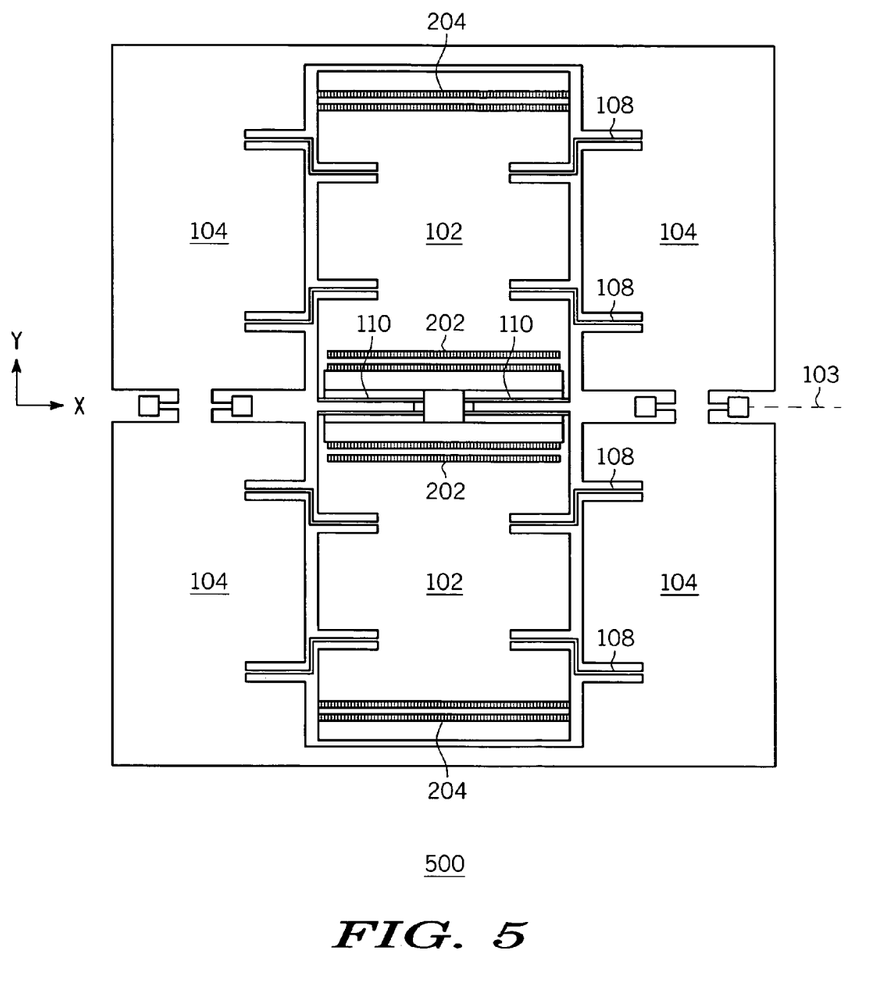
FIG. 5 is a top view of an x-gyro in accordance with an alternate embodiment.

FIG. 5 shows an alternate embodiment of an x-gyro 500. In this embodiment, the sense mass 104 includes four main components 104 distributed symmetrically along the outside of the structure, with drive mass 102 comprising two main components configured to oscillate along the y-axis. Central springs 110 are coupling springs joining the two drive masses. Elongated link springs 108 (eight springs, in this embodiment) extend between sense mass 104 and drive mass 102. Again, the link springs may be any convenient shape that allows a large motion of the drive mass along the y-axis and yet is rigid enough to transfer the Coriolis force from the drive mass to the sense mass along the z-axis. When sense mass 104 undergoes an oscillatory out-of-plane motion, the position change is sensed by electrodes (not shown) above and below the sense mass. This results in two capacitors: one formed by the bottom electrode and the middle rocking electrode (104), and one formed by the top electrode and the middle rocking electrode. During operation, one capacitance increases, while the other capacitance decreases. This change in capacitance is sensed electronically, in the conventional manner.

As mentioned previously, it is desirable to incorporate drive electrodes and sense electrodes in some form within the structure of the x-gyro. In accordance with one embodiment, the sense electrode structure includes a plurality of interdigitated capacitive pick-ups—i.e., interdigitated capacitive pick-ups including one set elongated pick-ups having a first thickness, and a second set of elongated pick-ups having a second thickness, wherein the first thickness is greater than the second thickness.

Figure 6:
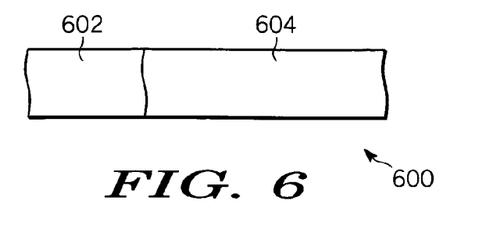
FIG. 6 is a side view of a capacitive pick-up in accordance with one embodiment.
Figure 7:
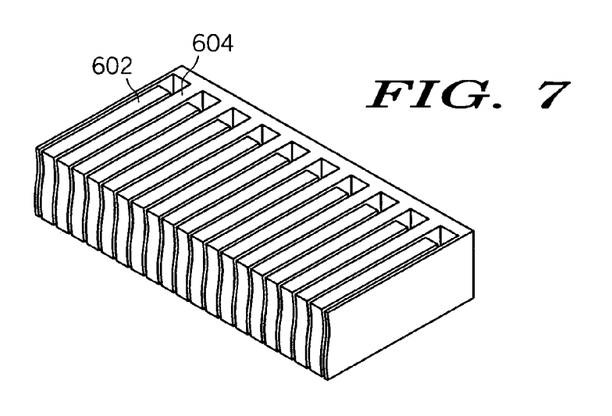
FIG. 7 is an isometric view of the capacitive pick-up structure of FIG. 6.

More particularly, referring to FIGS. 6-7, one form of capacitive pickup includes a set of capacitive elements 602 interdigitated with capacitive elements 604 such that, when elements 602 move with respect to elements 604, the capacitance changes, and this change can be correlated to some form of displacement (i.e., the movement of the sense mass and/or drive mass with respect to a reference structure, such as the coupling structure).

Figure 8:
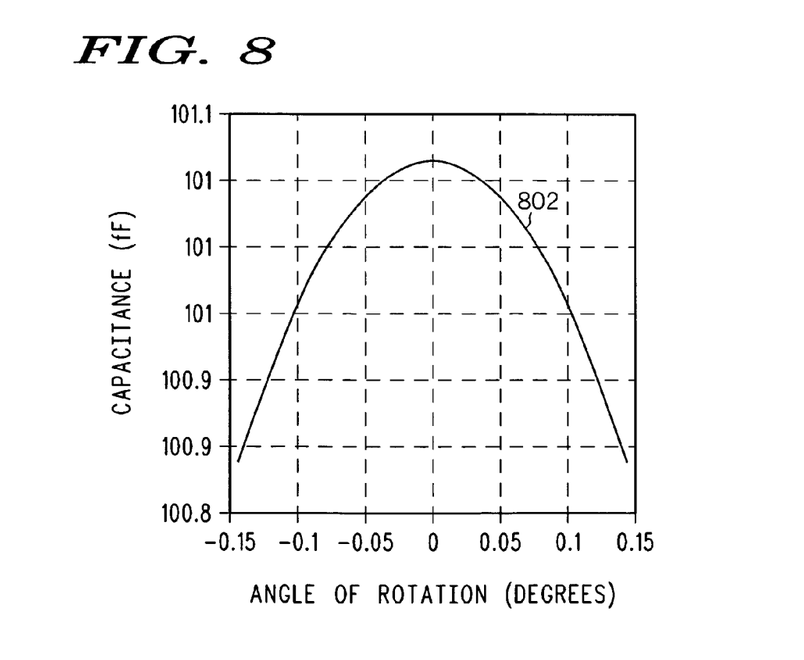
FIG. 8 is a graph showing an example response of the capacitive pick-up of FIG. 6.

One disadvantage of the design of FIG. 6, wherein the capacitive elements have the same thickness, is that the capacitance change is symmetrical over the range of angular rotation, so that it is not possible to determine the direction of motion. This is shown graphically in FIG. 8, wherein the capacitance of an exemplary pick-up structure is plotted against angle of rotation. As can be seen, the capacitance value is related to the absolute value of the rotation angle, making it difficult to determine whether the angular rotation is positive or negative.

Figure 9:
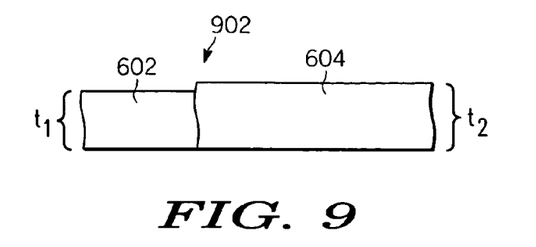
FIG. 9 is a side view of a capacitive pick up in accordance with another embodiment.
Figure 10:
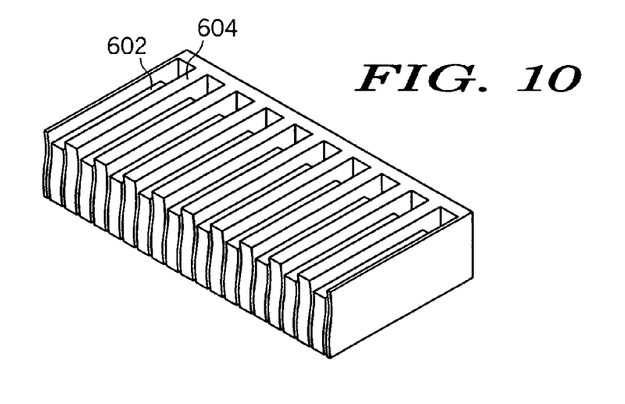
FIG. 10 is an isometric view of the capacitive pick-up structure of FIG. 9.
Figure 11:
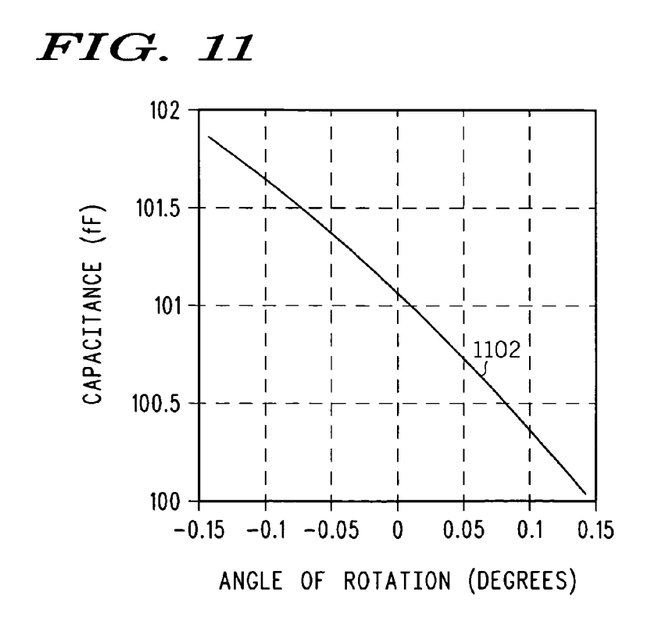
FIG. 11 is a graph showing an example response of the capacitive pick-up of FIG. 9.

In contrast, FIGS. 9 and 10 depict an alternate capacitive pick-up scheme wherein the elements have unequal thicknesses (e.g., such that $t_2 > t_1$). In this embodiment, when elements 602 move with respect to elements 604, the capacitance value reflects whether the rotation is positive or negative. That is, referring to FIG. 11, the capacitance value decreases monotonically as the angle of rotation ranges from a negative value to a positive value. It will be appreciated that the various capacitive elements 604 and 602 may be otherwise modified to provide the same direction-specific response—e.g., by increasing the width, length, or geometry of the various elements.

In summary, what has been described is a gyro sensor configured to sense an angular rate about a rotational axis. The gyro sensor includes: a drive mass configured to undergo oscillatory linear motion within a plane; a sense mass configured to undergo an oscillatory motion out of the plane as a function of the angular rate; and a link spring component connecting the sense mass to the drive mass such that the sense mass is substantially decoupled from the drive mass with respect to the oscillatory linear motion of the drive mass, but is substantially coupled to the drive mass with respect to the oscillatory motion out of the plane of the sense mass.

In one embodiment, the rotational axis is designated as an x-axis, and the drive mass undergoes the oscillatory linear motion substantially parallel to a z-axis perpendicular to the x-axis. The oscillatory motion out of the plane occurs along a z-axis orthogonal to the x-axis and the y-axis.

A further embodiment includes a coupling structure that joins the drive masses to synchronize the drive frequency.

In another embodiment, the gyro sensor further includes a drive electrode structure configured to produce, in response to an electrical signal, the oscillatory linear motion of the drive mass within the plane, and a sense electrode structure configured to sense the oscillatory motion out of the plane of the sense mass. In one embodiment, the sense electrode structure includes a plurality of interdigitated capacitive pickups—for example, a first set elongated pick-ups having a first thickness, and a second set of elongated pick-ups having a second thickness, wherein the first thickness is greater than the second thickness.

A method for sensing an angular rate about a rotational axis includes: providing a drive mass coupled to a sense mass via a link spring component such that the sense mass is substantially decoupled from the drive mass with respect to an oscillatory linear motion of the drive mass within a plane, but is substantially coupled to the drive mass with respect to an oscillatory motion out of the plane; actuating the drive mass such that it undergoes the oscillatory linear motion within the plane; sensing the oscillatory motion out of the plane of the sense mass; determining the angular rate about the rotational axis based on the sensed oscillatory motion out of the plane of the sense mass.

In one embodiment, the rotational axis is designated as an x-axis, and the drive mass undergoes the oscillatory linear motion substantially parallel to a y-axis perpendicular to the x-axis. The oscillatory motion out of the plane occurs along a z-axis orthogonal to the x-axis and the y-axis.

A further embodiment of the method includes actuating the drive mass via a drive electrode structure configured to produce, in response to an electrical signal, the oscillatory linear motion, and sensing the oscillatory motion out of the plane of the sense mass via a sense electrode structure.

In one embodiment, the oscillatory motion out of the plane is sensed using interdigitated capacitive pick-ups that include a first set elongated pick-ups having a first thickness, and a second set of elongated pick-ups having a second thickness, wherein the first thickness and second thickness are different.

A micro-electro-mechanical system (MEMS) gyro sensor configured to sense an angular rate about a rotational axis includes: a substantially planar drive mass configured to undergo oscillatory linear motion within a plane; a substantially planar sense mass configured to undergo an oscillatory motion out of the plane as a function of the angular rate; a coupling structure substantially joining the planar drive mass, and a link spring component connecting the planar sense mass to the planar drive mass such that the planar sense mass is substantially decoupled from the planar drive mass with respect to the planar oscillatory linear motion of the planar drive mass, but is substantially coupled to the planar drive mass with respect to the oscillatory motion out of the plane of the planar sense mass.

One embodiment further includes a sense electrode structure configured to sense the oscillatory motion out of the plane of the planar sense mass, wherein the sense electrode structure includes a plurality of interdigitated capacitive pick-ups. In one embodiment, the interdigitated capacitive pick-ups include a first set elongated pick-ups having a first thickness, and a second set of elongated pick-ups having a second thickness, wherein the first and second thickness are different.

In one embodiment, the sense mass includes a first pair of MEMS structures exhibiting reflectional symmetrically with respect to the rotational axis, and the drive mass includes a second pair of MEMS structure exhibiting reflectional symmetrically with respect to the rotational axis. In another embodiment, the link spring component comprises a generally "u"-shaped MEMS connector having a major axis substantially perpendicular to the oscillatory motion of the drive mass.

While at least one example embodiment has been presented in the foregoing detailed description, it should be appreciated that a vast number of variations exist. It should also be appreciated that the example embodiment or embodiments described herein are not intended to limit the scope, applicability, or configuration of the various embodiments in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A gyro sensor configured to sense an angular rate about a rotational axis, the gyro sensor comprising:
   a drive mass configured to undergo oscillatory linear motion within a plane;
   a sense mass configured to undergo an oscillatory motion out of the plane as a function of the angular rate; and a link spring component connecting the sense mass to the drive mass such that the sense mass is substantially decoupled from the drive mass with respect to the oscillatory linear motion of the drive mass, but is substantially coupled to the drive mass with respect to the oscillatory motion out of the plane of the sense mass.

2. The gyro sensor of claim 1, wherein the rotational axis is designated as an x-axis, and the drive mass undergoes the oscillatory linear motion substantially parallel to a y-axis perpendicular to the x-axis.

3. The gyro sensor of claim 2, wherein the oscillatory motion out of the plane occurs along a z-axis orthogonal to the x-axis and the y-axis.

4. The gyro sensor of claim 1, further including a coupling structure connected to The drive mass via a drive spring.

5. The gyro sensor of claim 4, wherein the drive spring is configured such that the drive mass exhibits substantially a single oscillation frequency.

6. The gyro sensor of claim 1, further including a drive electrode structure configured to produce, in response to an electrical signal, the oscillatory linear motion of the drive mass within the plane.

7. The gyro sensor of claim 1, further including a sense electrode structure configured to sense the oscillatory motion out of the plane of the sense mass.

8. The gyro sensor of claim 7, wherein the sense electrode structure includes a plurality of interdigitated capacitive pick-ups.

9. The gyro sensor of claim 8, wherein the interdigitated capacitive pick-ups include a first set elongated pick-ups having a first thickness, and a second set of elongated pick-ups having a second thickness, wherein the first thickness and the second thickness are not equal.

10. A method for sensing an angular rate about a rotational axis, the method comprising:
providing a drive mass coupled to a sense mass via a link spring component such that the sense mass is substantially decoupled from the drive mass with respect to an oscillatory linear motion of the drive mass within a plane, but is substantially coupled to the drive mass with respect to an oscillatory motion out of the plane;
actuating the drive mass such that it undergoes the oscillatory linear motion within the plane;
sensing the oscillatory motion out of the plane of the sense mass;
determining the angular rate about the rotational axis based on the sensed oscillatory motion out of the plane of the sense mass.

11. The method of claim 1, wherein the rotational axis is designated as an x-axis, and the drive mass undergoes the oscillatory linear motion substantially parallel to a y-axis perpendicular to the x-axis.

12. The method of claim 11, wherein the oscillatory motion out of the plane occurs along a z-axis orthogonal to the x-axis and the y-axis.

13. The method of claim 10, further including actuating the drive mass via a drive electrode structure configured to produce, in response to an electrical signal, the oscillatory linear motion.

14. The method of claim 10, further including sensing the oscillatory motion out of the plane of the sense mass via a sense electrode structure.

15. The method of claim 14, wherein the oscillatory motion out of the plane is sensed using interdigitated capacitive pick-ups that include a first set elongated pick-ups having a first thickness, and a second set of elongated pick-ups having a second thickness, where the first thickness and the second thickness are not equal.

16. A micro-electro-mechanical system (MEMS) gyro sensor configured to sense an angular rate about a rotational axis, the gyro sensor comprising:
a substantially planar drive mass configured to undergo oscillatory linear motion within a plane;
a substantially planar sense mass configured to undergo an oscillatory motion out of the plane as a function of the angular rate;
a coupling structure substantially joining the drive mass, wherein the coupling structure is connected to the planar drive mass via a coupling spring structure; and
a link spring component connecting the planar sense mass to the planar drive mass such that the planar sense mass is substantially decoupled from the planar drive mass with respect to the planar oscillatory linear motion of the planar drive mass, but is substantially coupled to the planar drive mass with respect to the oscillatory motion out of the plane of the planar sense mass.

17. The MEMS gyro sensor of claim 16, further including a sense electrode structure configured to sense the oscillatory motion out of the plane of the planar sense mass, wherein the sense electrode structure includes a plurality of interdigitated capacitive pickups.

18. The MEMS gyro sensor of claim 17, wherein the interdigitated capacitive pick-ups include a first set elongated pick-ups having a first thickness, and a second set of elongated pick-ups having a second thickness, wherein the first thickness is not equal to the second thickness.

19. The MEMS gyro sensor of claim 16, wherein the sense mass includes a first pair of MEMS structures exhibiting reflectional symmetrically with respect to the rotational axis, and the drive mass includes a second pair of MEMS structure exhibiting reflectional symmetrically with respect to the rotational axis.

20. The MEMS gyro sensor of claim 16, wherein the link spring component comprises a generally "u"-shaped MEMS connector having a major axis substantially perpendicular to the oscillatory motion of the drive mass.

* * * * *